(12) United States Patent
Schütz

(10) Patent No.: US 7,559,431 B2
(45) Date of Patent: Jul. 14, 2009

(54) TRANSPORT AND STORAGE CONTAINER FOR LIQUIDS AND METHOD FOR MANUFACTURING AN INNER PLASTIC CONTAINER OF THE TRANSPORT AND STORAGE CONTAINER

(75) Inventor: Udo Schütz, Selters/Westerwald (DE)

(73) Assignee: Protechna S.A., Fribourg (CH)

( * ) Notice: Subject to any disclaimer, the term of this patent is extended or adjusted under 35 U.S.C. 154(b) by 930 days.

(21) Appl. No.: 10/664,181

(22) Filed: Sep. 17, 2003

(65) Prior Publication Data

US 2004/0089659 A1 May 13, 2004

(30) Foreign Application Priority Data

Sep. 17, 2002 (DE) ................................. 102 42 956

(51) Int. Cl.
*B65D 21/02* (2006.01)
(52) U.S. Cl. ................. 220/23.87; 220/1.6; 220/495.01
(58) Field of Classification Search ............ 220/495.05, 220/495.01, 612, 9.4, 23.87, 62.11, 62.22, 220/62.19, 1.6; 361/212; 383/105, 107, 383/109, 108
See application file for complete search history.

(56) References Cited

U.S. PATENT DOCUMENTS 2,426,820 A * 9/1947 Evans et al. .............. 220/62.22
5,756,168 A * 5/1998 Maag ....................... 428/34.1
6,050,437 A * 4/2000 Schutz ...................... 220/4.12
6,156,969 A 12/2000 Schütz
2002/0110658 A1 * 8/2002 Lucke et al. ................ 428/35.7

FOREIGN PATENT DOCUMENTS

| DE | 7341620 U | * | 11/1973 |
|---|---|---|---|
| DE | 196 05 890 A1 | | 8/1997 |
| DE | 197 31 518 A1 | | 2/1999 |
| DE | 198 15 082 A1 | | 10/1999 |
| DE | 10042297 | | 3/2002 |
| DE | 20206436 | | 9/2002 |
| EP | 0726132 | | 8/1996 |

* cited by examiner

*Primary Examiner*—Anthony D Stashick
*Assistant Examiner*—Harry A Grosso
(74) *Attorney, Agent, or Firm*—Friedrich Kueffner

(57) ABSTRACT

A transport and storage container for liquids has a pallet-shaped support frame of metal or of an electrically conducting plastic material. An exchangeable inner container of plastic material is supported on the support frame and has four sidewalls, a bottom, and a top. The inner container further has an upper closable fill socket and a lower outlet socket with a tapping fixture or an upper closable tapping socket. An outer jacket surrounds the inner container and is made of grade bars of metal or sheet metal. The inner container has a single-layer or multi-layer body. The inner container has integral electrically conducting sections comprised of an electrically conducting plastic material, wherein the electrically conducting sections form electrical connections between an inner surface and an outer surface of the inner container.

5 Claims, 2 Drawing Sheets

Fig. 2
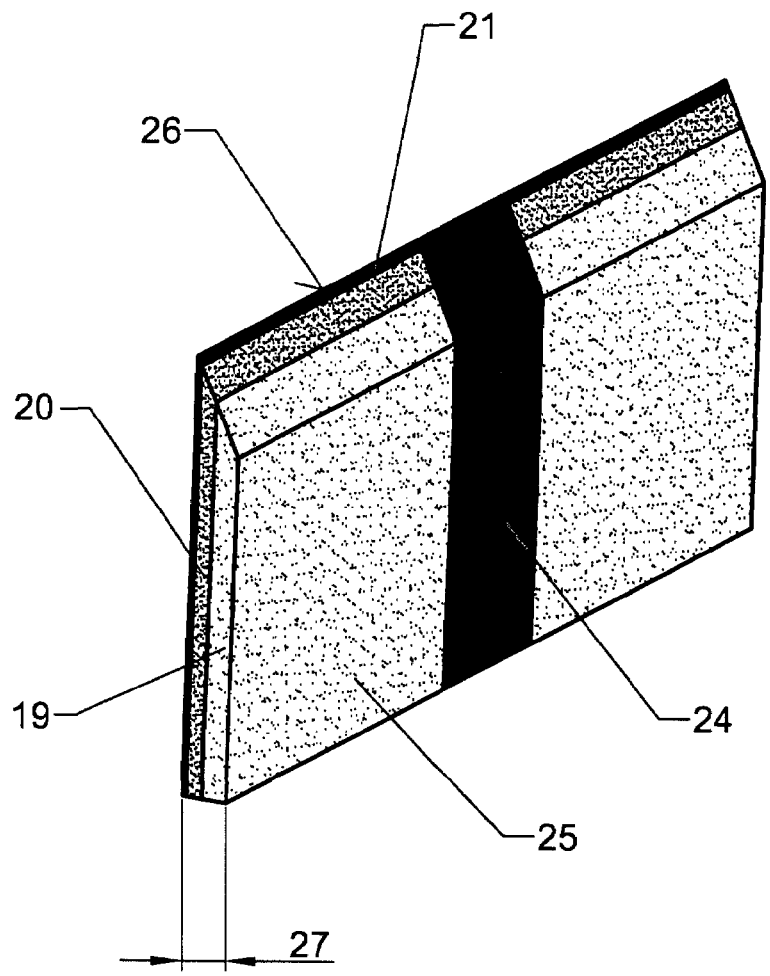
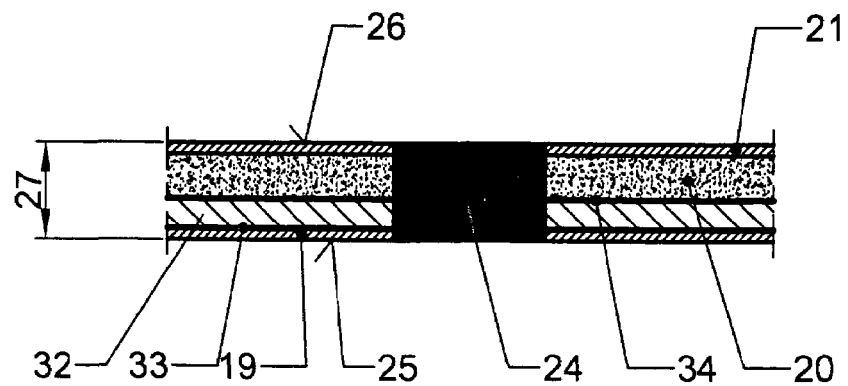
Fig. 3

TRANSPORT AND STORAGE CONTAINER FOR LIQUIDS AND METHOD FOR MANUFACTURING AN INNER PLASTIC CONTAINER OF THE TRANSPORT AND STORAGE CONTAINER

BACKGROUND OF THE INVENTION

1. Field of the Invention

The invention relates to a transport and storage container for liquids, comprising a pallet-shaped support frame of metal or of an electrically conducting plastic material, an exchangeable inner container of plastic material supported on the support frame provided with four sidewalls, a bottom, and a top, an upper closable fill socket, and a lower outlet socket with a tapping fixture or an upper closable tapping socket. The transport and storage container also comprises an outer jacket surrounding the inner container and being comprised of grade bars of metal or sheet metal.

2. Description of the Related Art

The inner plastic container of the transport and storage container of the aforementioned kind for liquids, as disclosed in DE 196 05 890 A1, has a permanently antistatic outer layer which serves together with the metallic support frame as electrical grounding means in order to prevent electrostatic charging of the surface of the inner plastic container by friction of the inner container on the metallic outer jacket during transport. In this way, electrical discharges with spark generation between the inner plastic container and the metal grade jacket, which could result in ignition of flammable materials contained in the transport and storage container and of explosive mixtures of gases and vapors in closed rooms, is to be prevented. However, this exterior grounding by means of a permanently antistatic outer layer of the plastic container cannot dissipate electric charges which are caused during filling and emptying of the inner container and stirring of liquids, for example, for mixing purposes, by friction of liquid on the inner surface of the container and by friction within the liquid itself.

DE 197 31 518 A1 describes a transport and storage container for liquids which is grounded by means of a grade hood of thin metal wire placed onto the inner plastic container or an electrically conducting net or woven fabric applied onto the inner container. With this outer grounding only the electrical charges occurring on the outer surface of the container are dissipated as in the case of the transport and storage container according to DE 196 05 890 A1. Moreover, the electrical grounding of the liquid container by a grade hood, a net or a woven fabric is technically complex and results in a corresponding increase of the manufacturing costs.

In the transport and storage container for liquids disclosed in DE 198 15 082 A1, a grounding member is provided on the tapping fixture mounted on the outlet socket of the inner container. It is embodied as a curved sheet metal or metal plate that extends across a portion of the inner bore of the tapping fixture and is connected by means of a fastening screw and a grounding cable to the support frame of the container. By means of this internal grounding action only the electrical charges which form within the liquid as a result of liquid friction are dissipated. Moreover, this liquid container entails the danger that upon transport and storage of aggressive liquids the grounding member is damaged by the liquid such that the electrical grounding action is no longer functioning.

SUMMARY OF THE INVENTION

It is an object of the present invention to further develop the transport and storage container for liquids of the aforementioned kind with respect to a safe and complete grounding action of the inner plastic container and an inexpensive manufacture.

In accordance with the present invention, this is achieved in regard to the container in that the body of the single-layer or multi-layer inner container has integral sections comprised of an electrically conducting plastic material wherein the sections form electrical connections between the inner surface and the outer surface of the inner container. In accordance with the present invention this is furthermore achieved with regard to the method according to a first embodiment by extrusion of a single layer or coextrusion of a multi-layer hose-shaped blank from a non-conducting base material, wherein the hose-shaped blank has strips comprised of an electrically conducting material and distributed about a periphery of the hose-shaped blank and by blow forming the hose-shaped blank to an inner container in a blow mold. According to a second embodiment of the method, this is achieved by extrusion of a single-layer or coextrusion of a multi-layer hose-shaped blank, wherein the blank is extruded by the extruder head continuously or discontinuously; by splitting the blank at locations distributed about a periphery of the blank and by injecting into the resulting gaps an electrically conducting plastic material for forming strips, which fuse homogeneously with the material of the hose-shaped blank; and by blow molding the blank containing the strips to an inner container in a blow mold.

The strips of an electrically conducting plastic material, embedded in the walls and the bottom and the top of the inner container of the transport and storage container and having a thickness matching the wall thickness of the inner container, provide electrical connections between the inner and outer surfaces of the multi-layer inner container, provided with a permanently antistatic outer layer, so that electrical charges, caused in the liquid goods contained in the container and on the inner surface of the inner container by liquid friction as well as the electrical charges generated on the outer surface of the inner container by friction of the inner container and the metallic outer jacket on one another, are dissipated or discharged into the ground by means of the electrically conducting strips of the wall as well as the bottom and top and the permanently antistatic outer layer of the inner container as well as the electrically conducting pallet-shaped support frame. The electrically conducting strips of a plastic material having a strength that is less than that of the basic plastic material of the inner container of the transport and storage container, can be arranged in areas of the extrusion blow-molded inner container that are stressed less, for example, in the plane of separation of the blow mold so that the strength properties of the inner container as a whole are not affected. The limited use of the expensive antistatic plastic material, for example, high-density polyethylene containing conducting carbon black, for embodying the electrically conducting strips and for the permanently antistatic outer layer of the inner plastic container, whose other parts are comprised of inexpensive plastic material such as high-density polyethylene, results only in a minimal increase of manufacturing costs. The electric grounding of the container surface and of the interior of the inner plastic container and of the liquids to be transported or to be stored therein makes possible the utilization of the transport and storage container as a container for hazardous (flammable) liquids and emulsions such as solvents, paints, and lacquers with a flash point <35° C. as well as the use of the container in work rooms in which an explosive atmosphere can be formed that is comprised of gases, vapors, or mist.

BRIEF DESCRIPTION OF THE DRAWING

In the drawing:

FIG. 2 shows a wall section of the inner plastic container of the transport and storage container of a three-layer configuration in an enlarged perspective illustration; and FIG. 3 shows a partial cross-section of an inner container of a six-layer configuration in an enlarged illustration.

DESCRIPTION OF THE PREFERRED EMBODIMENTS

Figure 1:
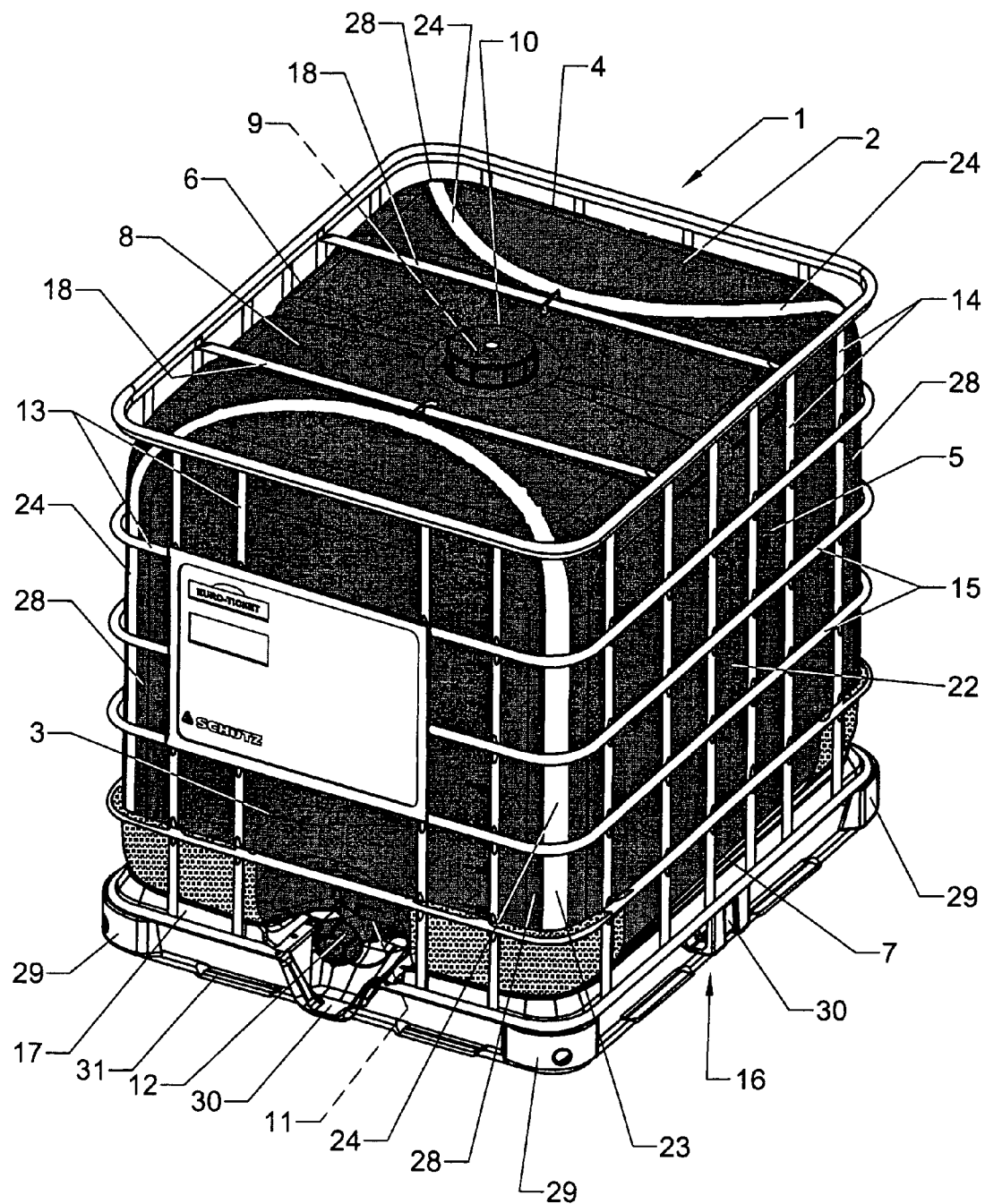
FIG. 1 is a perspective illustration of a transport and storage container.

The transport and storage container 1 for liquids, which can be used as a disposable or reusable container, has the following main components: an exchangeable parallelepipedal inner container 2 of polyethylene comprising an end wall 3, a back wall 4, and two sidewalls 5, 6 as well as a bottom 7, configured as a drainage bottom, and a top 8 provided with a fill socket 9 that can be closed by a screw lid 10 as well as an outlet socket 11 in the lower section of the end wall 3 comprising a tapping fixture 12; an outer jacket 13 of crossing vertical and horizontal grade bars 14, 15 made of metal; a pallet-shaped support frame 16 with a bottom tub 17 made of sheet metal for receiving the inner plastic container 2; as well as two top bars 18 of metal for protecting the inner container 2.

FIG. 2 illustrates that the end wall 3, the back wall 4, the side walls 5, 6 as well as the bottom 7 and the top 8 of the inner plastic container 2, produced of high-density polyethylene by extrusion blow molding, are comprised of an inner layer 19, a central layer 20 as well as a permanently antistatic outer layer 21 containing a proportion of conducting carbon black ensuring a specific surface resistance of less than or equal to $10^5$ Ohm and a specific volume resistance of less than or equal to $10^3$ Ohm. The thickness of the central layer 20 is 1 to 2 mm, preferably 1.5 mm, and the thickness of the inner and outer layers 19, 21 is 0.1 to 0.5 mm, preferably 0.2 mm.

For manufacturing the central layer 20 a recycled granular material or ground material of pure polyethylene and/or polyethylene containing conducting carbon black is used, and as the starting material for the inner and the outer layers 19, 21 new granular polyethylene material is used.

FIG. 3 shows a six-layer configuration of the inner plastic container 2 comprising an inner layer 19 of pure high-density polyethylene (HDPE); a barrier layer 32 of polyamide (PA) or ethylene vinyl acetate copolymer (EVA), provided against permeation of oxygen and hydrocarbons and embedded in two bonding agent layers 33, 34 of low-density polyethylene (LLDPE); a central layer 20 of recycled granular or ground material of pure high-density polyethylene and/or high-density polyethylene containing conducting carbon black; as well as a permanently antistatic outer layer 21 of high-density polyethylene containing conducting carbon black.

Into the body 22 of the inner container 2 electrically conduction sections 23 formed as strips 24 and made of high-density polyethylene containing conducting carbon black are integrated; they provide electrical connections between the inner surface 25 and the outer surface 26 of the inner container 2 and have a wall thickness matching the wall thickness 27 of the inner container 2. The electrically conducting strips 24 (the light colored portions in FIG. 1) extend vertically across the corner areas 28 between the lateral walls 3-6 and/or the walls and at a slant across the bottom 7 and the top 8 of the inner container 2.

The screw lid 10 for closing the fill socket 9 and the tapping fixture 12 of the inner container 2 can be made of an electrically conducting plastic material, preferably high-density polyethylene containing carbon black.

The bottom tub 17 of the support frame 16 is positioned at a certain spacing on corner and center legs 29, 30 and a bottom frame 31 or rails so that the bottom tub 17 for transporting the container 1 can be engaged from below at four sides by the gripping arms of a transport devise, such as a forklift. The legs 29, 30 and the bottom frame 31 or the rails are made of metal or an the electrically conducting plastic material, for example, polyethylene containing conducting carbon black so that the transport and storage container 1 is electrically grounded by means of the electrically conducting strips 24, the permanently antistatic outer layer 21 of the inner plastic container 2, the outer jacket 13 and the support frame 16; in this way, electrical charges which are formed on the inner surface of the inner container and in the liquid goods as well as on the outer container surface can be dissipated.

When manufacturing the inner plastic container 2 of the transport and storage container 1, first a multi-layer hose-shaped blank with strips distributed about the periphery is coextruded, wherein the base material of the blank is non-conducting material, in particular, high-density polyethylene, and the strips are made of an electrically conducting material, in particular, high-density polyethylene containing a conducting carbon black component, and, subsequently, the blank is blown in a blow mold to an inner container.

A further method for producing the inner plastic container of the transport an storage container described above is characterized by coextrusion of a multi-layer hose-shaped blank, wherein the hose-shaped blank is extruded continuously or discontinuously from the extruder head and is split at locations distributed about the periphery, wherein into the resulting gaps an electrically conducting plastic material is injected for forming strips that homogeneously fuse with the hose-shaped blank. Subsequently, the blank with the strips is blow molded to an inner container in a blow mold.

While specific embodiments of the invention have been shown and described in detail to illustrate the inventive principles, it will be understood that the invention may be embodied otherwise without departing from such principles.

What is claimed is:

1. A transport and storage container for liquids comprising:
a pallet-shaped support frame of metal or of an electrically conducting plastic material;
an exchangeable inner container of plastic material supported on the support frame and having four sidewalls, a bottom, and a top;
wherein the inner container further comprises an upper closable fill socket and a lower outlet socket with a tapping fixture or an upper closable tapping socket;
an outer jacket surrounding the inner container and being comprised of grade bars of metal or sheet metal;
wherein the inner container is produced by extrusion blow molding and has a single-layer or multi-layer body;
wherein the inner container has integral electrically conducting sections comprised of an electrically conducting plastic material, wherein the electrically conducting sections form electrical connections between an inner surface and an outer surface of the inner container;
wherein the electrically conducting sections are strips having a thickness matching a wall thickness of the inner container;
wherein the electrically conducting strips extend across at least one of the sidewalls and/or the corner areas between the sidewalls of the inner container.

2. The container according to claim 1, wherein the electrically conducting strips have a vertical extension.

3. The container according to claim 2, wherein the electrically conducting strips extend across the sidewalls and the bottom of the inner container.

4. The container according to claim 2, wherein the electrically conducting strips extend across the sidewalls, the bottom, and the top of the inner container.

5. The container according to claim 1, wherein the inner container comprises a permanently antistatic outer layer.

* * * * *